(12) United States Patent
Kinnen

(10) Patent No.: US 9,074,961 B2
(45) Date of Patent: Jul. 7, 2015

(54) METHOD FOR LEAK-TESTING AND DEVICE FOR CARRYING OUT THE METHOD

(71) Applicant: Arno Kinnen, Fellbach (DE)

(72) Inventor: Arno Kinnen, Fellbach (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 400 days.

(21) Appl. No.: 13/693,414

(22) Filed: Dec. 4, 2012

(65) Prior Publication Data

US 2013/0145825 A1 Jun. 13, 2013

(30) Foreign Application Priority Data

Dec. 7, 2011 (DE) .......................... 10 2011 120 461

(51) Int. Cl.
*G01M 3/02* (2006.01)
*G01M 3/28* (2006.01)
*F02M 37/00* (2006.01)
*F02M 37/04* (2006.01)
*F02M 25/08* (2006.01)

(52) U.S. Cl.
CPC ................ *G01M 3/025* (2013.01); *G01M 3/28* (2013.01); *F02M 37/0029* (2013.01); *F02M 37/007* (2013.01); *F02M 37/046* (2013.01); *F02M 25/0818* (2013.01)

(58) Field of Classification Search
CPC ................................. G01M 3/02; G01M 3/025
USPC ........................................................ 73/40.5 R
See application file for complete search history.

(56) References Cited

U.S. PATENT DOCUMENTS

| 4,375,162 | A | * | 3/1983 | Eppley ............................... 73/37 |
| 5,187,974 | A | * | 2/1993 | Mellits et al. .................. 73/49.7 |
| 5,705,737 | A | * | 1/1998 | Liao ............................... 73/49.7 |
| 7,624,624 | B2 | * | 12/2009 | Meskouri et al. ............. 73/49.7 |
| 2011/0283777 | A1 | * | 11/2011 | Chrissis ......................... 73/40.7 |

* cited by examiner

*Primary Examiner* — Peter Macchiarolo
*Assistant Examiner* — Nathaniel Kolb
(74) *Attorney, Agent, or Firm* — Paul D. Strain, Esq.; Strain & Strain PLLC

(57) ABSTRACT

A method for leak-testing a fuel supply system has been provided, wherein the fuel supply system comprises a fuel tank, a fuel injection valve, fuel lines between the fuel tank and the fuel valve, and a control valve controlled by a diaphragm, and wherein the diaphragm bounds a control chamber on one side, the method comprising: acting upon the portion of the fuel supply system upstream of the control valve with a predetermined pressure level, acting upon the side of the diaphragm facing away from the control chamber with a counterforce, wherein the counterforce is equal or greater to the predetermined pressure level. A device for leak-testing a fuel system according to the above method, wherein the device comprises a test pressure unit with at least one test pressure line, wherein said test pressure line is connectable to the fuel supply system.

10 Claims, 2 Drawing Sheets

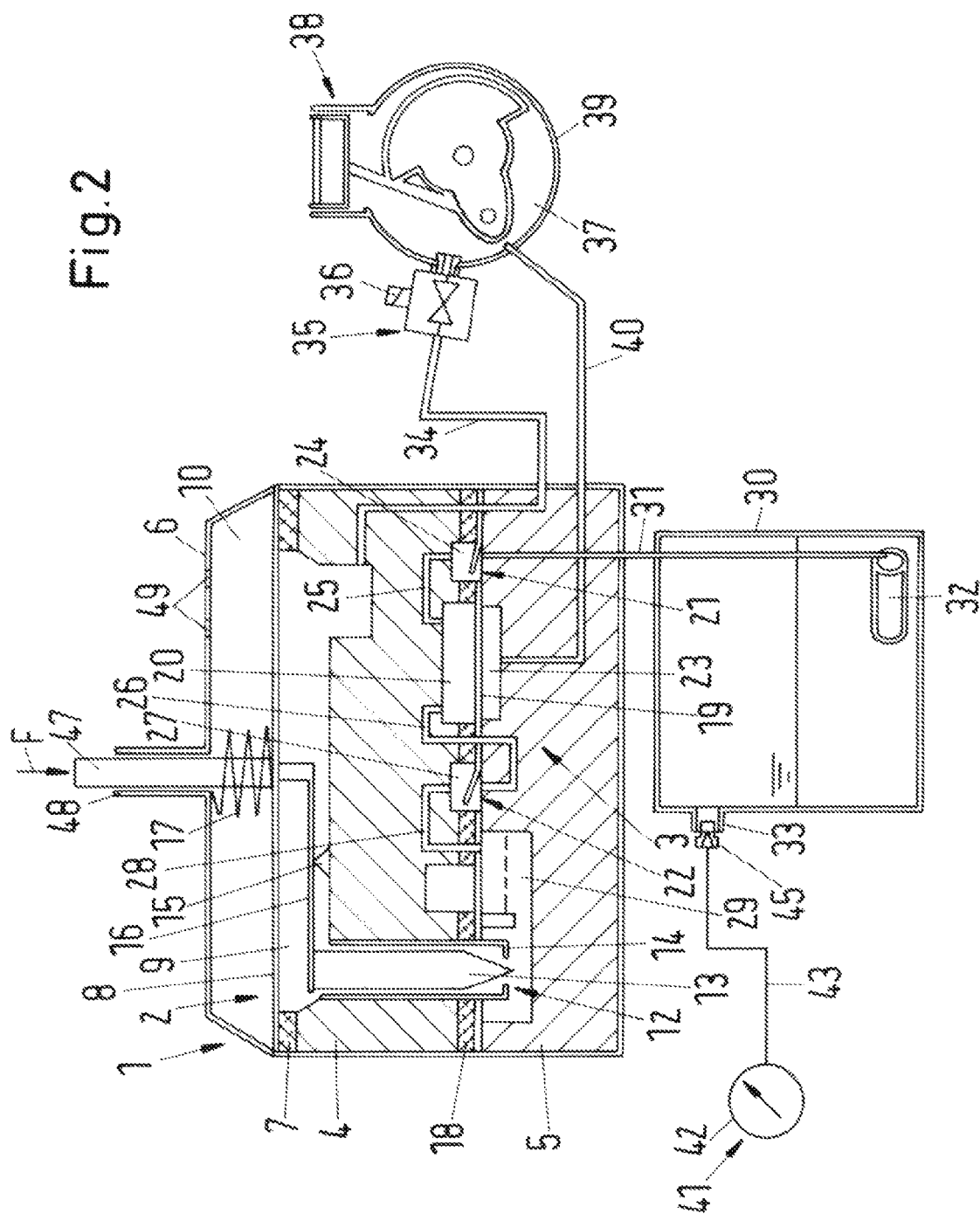

METHOD FOR LEAK-TESTING AND DEVICE FOR CARRYING OUT THE METHOD

CROSS-REFERENCE TO RELATED PATENT APPLICATIONS

This application is based upon and claims the benefit of priority from prior German Patent Application No. 10 2011 120 461.3, filed Dec. 7, 2011, the entire contents of which are incorporated herein by reference in their entirety.

BACKGROUND

This application relates to methods for leak-testing a fuel supply system, wherein the fuel supply system comprises a fuel tank, a fuel injection valve, fuel lines between the fuel tank and the fuel valve, and a control valve controlled by a diaphragm, wherein the diaphragm bounds a control chamber on one side, wherein the control chamber is filled with fuel, and wherein the control valve closes when the pressure in the control chamber rises above a predetermined pressure, the method comprising:

acting upon the portion of the fuel supply system upstream of the control valve with a predetermined pressure level, acting upon the side of the diaphragm facing away from the control chamber with a counterforce, wherein the counterforce is equal to or greater than the predetermined pressure level.

This application also relates to a device for leak-testing a fuel system, wherein the device comprises a test pressure unit with at least one test pressure line, wherein said test pressure line is connectable to the fuel supply system. Handheld tools, such as motorized chain saws, trimmers, abrasive cutting-off machines or the like frequently have an internal combustion engine, in particular a two-stroke engine, as the driving mechanism. In order to supply the internal combustion engine with fuel, use is made of a fuel tank and a fuel line, which may comprise a plurality of sections, and a control valve. The control valve is actuated depending on the fuel pressure in a control chamber, wherein the fuel pressure in the control chamber acts on a diaphragm, the deflection of which moves a valve closing member relative to a valve seat via kinematics. Such a construction of a control valve in a fuel supply system has been tried and tested and is used both in the case of internal combustion engines having a carburetor and also in the case of those having fuel injection. In such a control valve, the diaphragm takes up different positions depending on the forces acting thereon, namely a first position, in which the control valve is completely open, a second position, in which the control valve is closed, and third positions which are located between said positions and in which the control valve is partially open.

Within the scope of production of a tool mentioned above, provision is made for the fuel supply system to be subjected to a pressure test in order to ensure the tightness of all of the fuel guiding elements. Use is made for this purpose of a test pressure which is a multiple of the operating pressure of the fuel system, for example is a multiple of 8 to 10 times. In the case of fuel systems having low pressure injection of the fuel into the engine, the pressure between a fuel pump and the injection valve is approximately 100 mbar, and the control valve is set for said pressure level. This is a problem for the pressure testing of the fuel lines and components arranged downstream of the control valve, because the respective fuel supply system sections located upstream of the control valve and downstream of the control valve have to be subjected to separate pressure tests.

SUMMARY OF PREFERRED EMBODIMENTS

It is therefore one object to provide a method for leak-testing a fuel supply system of the type having low pressure injection, said method permitting simultaneous pressure testing of the entire fuel supply system in a simple manner. In addition, it is an object to provide a simple and easily handled device for carrying out the method.

According to a preferred embodiment, there has been provided a method for leak-testing a fuel supply system wherein the fuel supply system comprises a fuel tank, a fuel injection valve, fuel lines between the fuel tank and the fuel valve, and a control valve controlled by a diaphragm, wherein the diaphragm bounds a control chamber on one side, wherein the control chamber is filled with fuel, and wherein the control valve closes when the pressure in the control chamber rises above a predetermined pressure, the method comprising:

acting upon the portion of the fuel supply system upstream of the control valve with a predetermined pressure level, acting upon the side of the diaphragm facing away from the control chamber with a counterforce, wherein the counterforce is equal to or greater than the predetermined pressure level.

According to another preferred embodiment, there has been provided a device for leak-testing a fuel system, wherein the device comprises a test pressure unit with at least one test pressure line, wherein said test pressure line is connectable to the fuel supply system.

According to another preferred embodiment, there has been provided a fuel supply system which comprises a fuel tank and a fuel injection valve in an internal combustion engine and fuel lines between said components and in which a control valve controlled by means of a diaphragm is arranged, wherein the diaphragm bounds a control chamber, which is filled with fuel, and the control valve is closed when there is a rise in pressure in the control chamber, wherein the fuel supply system upstream of the control valve is acted upon by a test pressure with a predetermined pressure level, and said pressure is built up in the fuel supply system, and that side of the diaphragm which faces away from the control chamber is acted upon by a counterforce, the magnitude of which is adjusted in such a manner that said counterforce at least corresponds to the pressure force acting on the diaphragm from the test pressure in the control chamber such that the control valve is kept in an open position, and by a device for carrying out the method, wherein the device comprises a test pressure unit with at least one test pressure line located thereon, wherein said test pressure line is connectable to the fuel supply system.

In one embodiment, it is possible to keep the diaphragm in the first or third position and also to feed a required test pressure over and beyond the pressure level of the customary operating or injection pressure to the fuel system connected downstream. Such pressures, by way of example, may be approximately 100 mbar. Advantageously, the action upon the entire fuel supply system by connecting a test pressure unit to just one connection for a test pressure line permits rapid and extremely reliable pressure testing. An exemplary device merely requires a test pressure unit and a test pressure line for connecting to the fuel supply system. In one aspect, the counterforce acting on the diaphragm is formed from two force components, wherein one is produced by a spring and a further one acts in the same direction on the diaphragm.

According to another embodiment, the further force component is applied to the diaphragm by a test pressure line being connected to a sealed space bounded by the diaphragm and a pressure being built up in said space, the pressure being the same magnitude as the test pressure in the control chamber. The diaphragm is thereby kept in the third position, because the forces acting on both sides of the diaphragm are compensated for.

In a further embodiment, it is possible that, of test pressure lines connected to a test pressure unit, one is fastened to a filler neck of the fuel tank and another is connected to a connecting stub of the housing cover spanning the diaphragm, and the test pressure is fed by the test pressure unit to the fuel tank and the space in the housing cover at the same time.

According to another embodiment, the further force component which acts on the diaphragm is produced mechanically and said force component keeps the diaphragm in the first or third position. The control valve is therefore kept in an open position.

Another embodiment comprises providing a free end of the test pressure line being with a coupling piece which is fastenable in the filler neck of the fuel tank. For said fastening, the coupling piece should be provided with the same fastener means as the tank cap provided for the filler neck. In addition, it is advantageous for the test pressure unit to be provided with a further test pressure line which is connectable to a housing cover which spans a space bounded by the diaphragm. The same test pressure can thereby be applied at the same time both in the control chamber and in the space on the other side of the diaphragm, and therefore separate adjusting means are not required. The counterforce is then greater by the force of the spring than the pressure force produced in the control chamber, thus ensuring that the control valve remains open. Said further test pressure line is expediently provided with a connecting piece which is connectable to a connecting stub on the housing cover. Further objects, features, and advantages of the present application will become apparent from the detailed description of preferred embodiments which is set forth below, when considered together with the figures of drawing.

BRIEF DESCRIPTION OF THE DRAWINGS

Several exemplary embodiments of the application are explained below with reference to the drawings, in which:

FIG. 2 shows another exemplary embodiment with respect to FIG. 1 with a mechanically produced force component.

DETAILED DESCRIPTION OF THE PREFERRED EMBODIMENTS

Figure 1:
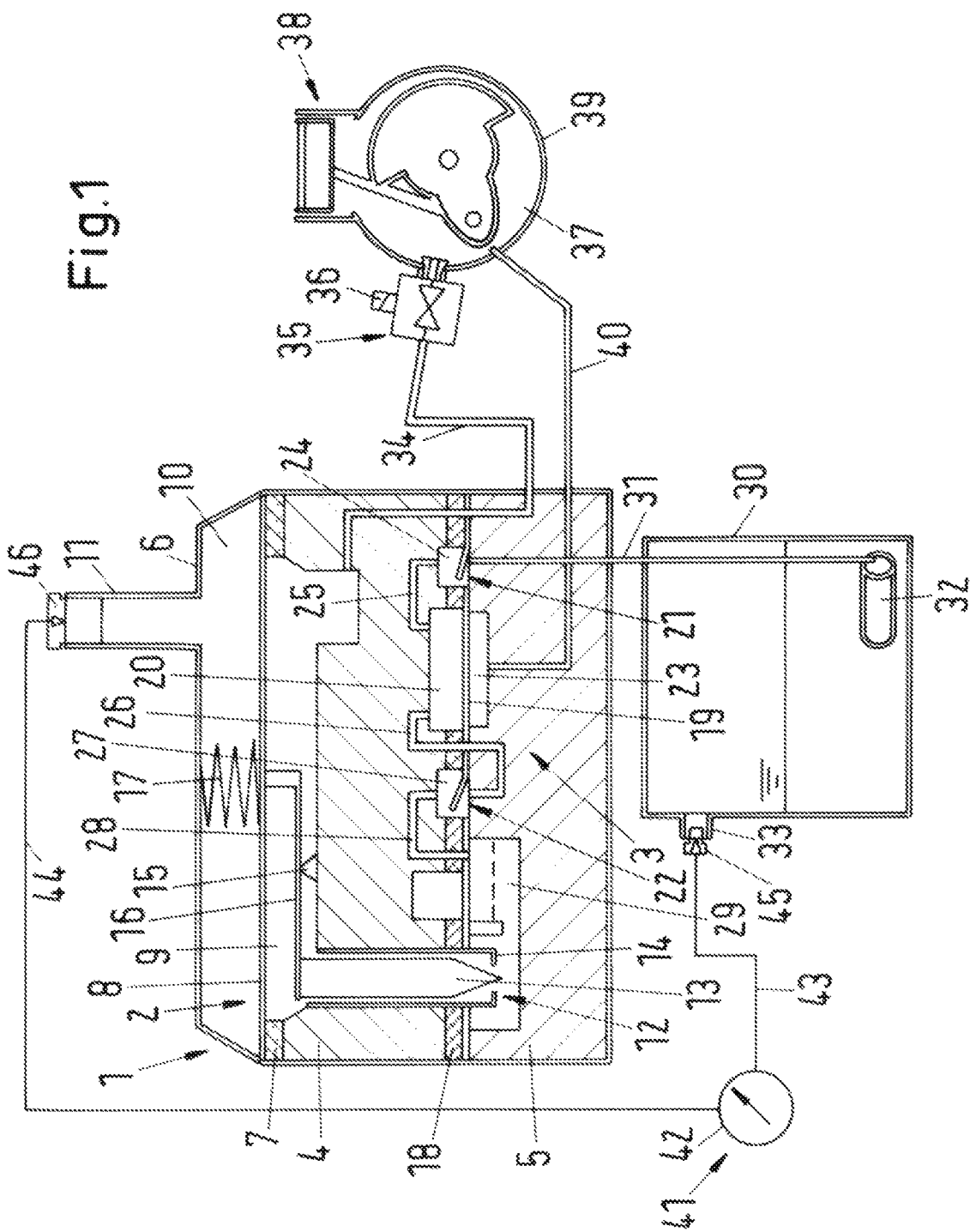
FIG. 1 shows a schematic arrangement of one exemplary embodiment of a fuel supply system for a low pressure injection in a two stroke engine.

Turning to the figures of drawing, in FIG. 1, a pressure regulator 2 and a diaphragm pump 3 are arranged in a housing 1. The housing 1 comprises a first housing part 4 and a second housing part 5 and also a housing cover 6 extending over the first housing part. On the circumferential edge of the first housing part 4, a seal 7 is located between the first housing part and the housing cover 6. A first diaphragm is arranged between the first housing part 4 and the housing cover 6, said diaphragm dividing a cavity formed between the first housing part 4 and the housing cover 6 into a control chamber 9 and a space 10 which is acted upon by atmospheric ambient pressure and is spanned by the housing cover 6. A connecting stub 11 mounted on the housing cover 6 is open at the outer end thereof, in particular with respect to the environment or with respect to the ambient pressure, for the normal operation of the pressure regulator 2. The pressure regulator 2 comprises a control valve 12 which consists of a valve closing member 13 and a valve seat 14, and a lever 16 which is mounted at a pivot point 15 and is connected at one end into the diaphragm 8 and at the other end bears the valve closing member 13. The space 10 contains a spring 17 which acts on the diaphragm 8 and therefore loads the valve closing member 13 in the opening direction of the control valve 12. The fuel pressure in the control chamber 9 is adjustable by means of the spring 17.

A further seal 18 and a second diaphragm 19 are arranged between the first housing part 4 and the second housing part 5, the seal 18 being designed as a sealing plate which has sealing surfaces on the surfaces at which a first and second housing part 4, 5 bear against each other. The second diaphragm 19 serves as a diaphragm pump 3 which comprises a pump chamber 20 and an inlet valve 21 and an outlet valve 22. The pump chamber 20 is formed in the first housing part 4 and is bounded by the second diaphragm 19, on the other side of which a pulsation chamber 23 is provided in the second housing part 5. The inlet valve 21 is located in an inlet chamber 24 which is connected via a fuel line 25 to the pump chamber 20 from which a further fuel line 26 leads to the outlet valve 22 located in an outlet chamber 27. The outlet chamber 27 is connected via a fuel line 28 to a fuel space 29 which is formed in the second housing part 5 and into which the control valve 12 protrudes.

The diaphragm pump 3 is connected to a fuel tank 30, for example, by means of a fuel line 31. A suction head 32 is arranged at that end of the fuel line 31 which is located in the tank 30, and leads to the inlet valve 21. The fuel tank 30 has a filler neck 33 which is closed in a customary manner by a cap (not shown in the drawing).

A fuel line 34 leads from the control chamber 9 of the pressure regulator 2 to a valve 35 which, according to the exemplary embodiment illustrated, is actuated by an electromagnetic actuator 36 and serves to inject fuel at low pressure into the crank space 37 of a two stroke engine 38. A pulsation line 40 is connected to a crank case 39 and is guided into the pulsation chamber 23 of the diaphragm pump 3. The pressure changes occurring in the crank space 37 during the operation of the two stroke engine 38 are therefore transmitted into the pulsation chamber 23 and act upon the second diaphragm 19 in such a manner that the volume of the pump chamber 20 changes in an alternating manner.

Upon an increase in the volume, a negative pressure arises in the pump chamber 20, and therefore fuel is sucked out of the fuel tank 30 by the inlet valve 21. Upon a reduction in the volume, fuel is forced out of the pump chamber 20 by the inlet valve 22 into the fuel space 29. The fuel passes through the open control valve 12 into the control chamber 9. If a predetermined fuel pressure is reached in the control chamber 9, the first diaphragm 8 moves counter to the spring into the second position to such an extent, and accordingly the lever 16 rotates about the pivot point 15, that said lever presses the valve closing member 13 against the valve seat 14, thus closing the control valve 12. Only upon removal of fuel from the control chamber 9 by injection into the crank space 37 does the pressure level in the control chamber 9 drop such that the first diaphragm 8 is pressed by the spring 17 counter to the lever 16 into the first position and the control valve 12 opens again.

During the assembly of an apparatus equipped with the above described fuel supply system or else after repair, the fuel lines and chambers of the fuel system are normally subjected to a leak test, wherein all of the fuel lines as far as the connection to the crank case are usually included in the leak test. However, the leak test has to take place at a substantially higher pressure which is generally a multiple of the normal operating pressure (for example 100 mbar, as indicated in an exemplary embodiment). In the present example, the required test pressure is approx. 800 mbar. Because, however, the control valve 12 closes at a pressure level of 100 mbar in the control chamber 9, pressurization of the fuel supply system, for example of the tank interior, with the test pressure would merely cover the fuel lines as far as the control valve, but not the fuel lines arranged downstream.

According to the illustration in the drawing of one preferred embodiment, a device 41 for leak-testing is provided which consists of a test pressure unit 42 and test pressure lines 43, 44, wherein the test pressure line 43 is connected to the filler neck 33 of the fuel tank 30 and the test pressure line is connected to the connecting stub 11 of the housing cover 6. For a simple connection and reliable sealing, the free end of the test pressure line 43 is provided with a coupling piece 45 which is fastened in the filler neck 33, and the test pressure line 44 is provided with a connecting piece 46 which is inserted into the open end of the connecting stub 11.

For the leak-testing of the fuel supply system, the test pressure lines 43, 44, as illustrated in the drawing, are connected to the filler neck 33 and connecting stub 11. Air is then supplied by the test pressure unit 42 via the test pressure lines 43, 44 to the interior of the fuel tank 30 in the region above the liquid level and to the space 10 in the housing cover 6 and therefore the pressure is increased until the designated test pressure is reached. By means of a rise in pressure in the fuel tank 30, the pressure in the fuel system is also increased in the same manner, that is to say, all of the fuel lines 25, 26, 27, 28, 31, 34 and fuel chambers 9, 20, 24, 27, 29 are acted upon by the same pressure level. Because the test pressure is similarly also built up in the space 10 in the housing cover 6, the pressurization on both sides of the first diaphragm 8 is identical, and therefore the latter is in the third position, in which the control valve 12 is open. In this manner, the test pressure can act on all of the fuel guiding components from the tank as far as the valve 35 and the tightness of the system can be tested.

After the test is ended, the coupling piece 45 and the connecting piece 46 are detached from the filler neck 33 and connecting stub 11. The fuel supply system is then immediately operational without further measures.

An alternative embodiment of the device for leak-testing is illustrated in FIG. 2. Said embodiment consists in that only the test pressure line 43 of the test pressure unit 42 leads to the fuel tank 30 and is fastened to the coupling piece 45 on the filler neck 33. The further force component required at the first diaphragm 8 for keeping the control valve 12 open is applied by a mechanical device which is designed in FIG. 2 in the form of a tappet 47 mounted in a guide 48 on the housing cover 6. In one aspect, said tappet is preferably arranged concentrically in the spring 17 such that force is specifically introduced onto the diaphragm 8 at the point at which the diaphragm 8 interacts with the lever 16. By application of force to the tappet 47 in the direction of the arrow F and keeping the tappet in said position, for example by means of latching, the counterforce formed from the two force components is produced, and therefore the first diaphragm 8 remains in the third position illustrated even in the event of an increase in the pressure in the control chamber 9. In order to connect the space 10 to the outside so that the diaphragm 8 is acted upon by the ambient pressure, openings 49 are provided in the housing cover 6. With regard to all of the other elements, the reference numbers for identical parts correspond to those in FIG. 1.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

The invention claimed is:

1. A method for leak-testing a fuel supply system, wherein the fuel supply system comprises a fuel tank, a fuel injection valve, fuel lines between the fuel tank and the fuel valve, and a control valve controlled by a diaphragm, wherein the diaphragm bounds a control chamber on one side, wherein the control chamber is filled with fuel, and wherein the control valve closes when the pressure in the control chamber rises above a predetermined pressure, the method comprising:
    acting upon the portion of the fuel supply system upstream of the control valve with a predetermined pressure level,
    acting upon the side of the diaphragm facing away from the control chamber with a counterforce, wherein the counterforce is equal to or greater than the predetermined pressure level.

2. The method according to claim 1, wherein the counterforce is formed from a force component produced by a spring and from a further force component acting in the same direction on the diaphragm.

3. The method according to claim 2, wherein the further force component is applied to the diaphragm by a test pressure line connected to a sealed space bounded on one side by the diaphragm.

4. The method according to claim 2, wherein the predetermined pressure level is applied by a first test pressure line connected to a filler neck of a fuel tank and the counterforce is applied by a second test pressure line connected to a connecting stub of a housing cover spanning the diaphragm, wherein the predetermined pressure level and the counterforce is fed by the test pressure unit at the same time.

5. The method according to claim 2, wherein the further force component is produced mechanically and is applied to the diaphragm.

6. The method according to claim 5, wherein a tappet acting on the diaphragm is provided in order to mechanically produce the further force component.

7. A device for leak-testing a fuel system according to the method of claim 1, wherein the device comprises a test pressure unit with at least one test pressure line, wherein said test pressure line is connectable to the fuel supply system; and
    one or more additional test pressure lines connectable to a housing cover which spans a space bounded by the diaphragm.

8. The device according to claim 7, wherein the test pressure line is connectable to a filler neck of the fuel tank.

9. The device according to claim 8, wherein a free end of the test pressure line is provided with a coupling piece which is fastenable in the filler neck.

10. The device according to claim 8, wherein the one or more test pressure lines are provided with a connecting piece which is connectable to a connecting stub on the housing cover.

* * * * *